FREQUENCY AND AMPLITUDE MODULATION TRANSMITTER AND MODULATOR

Filed Sept. 13, 1965

INVENTOR.
ROBERT K. JEFFERS
BY
Martin LuKacher
ATTORNEY

United States Patent Office 3,378,773
Patented Apr. 16, 1968

3,378,773

FREQUENCY AND AMPLITUDE MODULATION TRANSMITTER AND MODULATOR

Robert K. Jeffers, Penfield, N.Y., assignor to General Dynamics Corporation, a corporation of Delaware Filed Sept. 13, 1965, Ser. No. 487,005
8 Claims. (Cl. 325—139)

ABSTRACT OF THE DISCLOSURE

The disclosure of this patent describes a system for transmitting signals which are either AM modulated, FM modulated, or both AM and FM modulated. The system includes a modulator circuit having two signal paths for an input carrier signal. In one of these paths, the carrier is shifted in phase by 90°. A balanced modulating circuit to which input signals to be FM modulated are applied is connected to the other path. A diode to which input signals which are to be AM modulated are applied is connected to the path which carries the phase shifted signals. The output of the modulator contains signals which are FM modulated and also signals which are AM modulated. The system also includes a heterodyning channel and a frequency multiplying channel to which the modulated signals from the modulator are simultaneously applied. Although the amplitude modulated signals are lost in the multiplying channel, they are preserved in the heterodyning process. The frequency deviation of the FM signals is increased in the frequency multiplying channel. The outputs of the respective channels are mixed with each other to provide a high frequency output signal for transmission.

The present invention relates to transmission systems, and particularly to a system for transmitting signals having a plurality of different modes of modulation.

The invention is especially suitable for use in a radio transmitter wherein it is desired to transmit, either alternatively or simultaneously, the same or different signals on the same radio frequency carrier. One signal may, for example, be amplitude modulation of the carrier while the other signal is frequency or phase modulation of the carrier. The invention may therefore be applied to a transmitter which is capable of simultaneously transmitting FM telemetry information and AM voice information on the same frequency.

Previous systems for transmitting signals on a carrier with different modes of modulation have included circuits for modulating the carrier at low level in accordance with one mode of modulation, usually frequency modulation, and then modulating the modulated carrier at high level in accordance with another mode of modulation, usually amplitude modulation. Such systems are undesirable inasmuch as two modulator circuits are involved, which adds to the cost and complexity of the system.

It is also desirable, in the interest of high quality signal transmission, to provide a wide frequency deviation capability of an FM modulated carrier. Such wide frequency deviation can be accomplished by multiplying the frequency of the modulated carrier. However, if the carrier should also be amplitude modulated at low level, such multiplication would destroy the amplitude modulation envelope. Accordingly, both low level amplitude and frequency modulation of a carrier, although desirable, has not been used in practice.

It is an object of the present invention to provide an improved system for transmitting signals which modulate the same carrier in accordance with a plurality of different modes of modulation.

It is a further object of the present invention to provide an improved system for the transmission of signals with either or both of two modes of modulation, such as amplitude modulation and frequency modulation.

It is a still further object of the present invention to provide a system for either or both FM and AM modes of modulation which may also be used for other modes of modulation, such as single side band (SSB), requiring a heterodyning process to achieve the desired final frequency of transmission.

It is a still further object of the present invention to provide an improved system for transmitting signals which requires only a single modulator, operative at low signal levels, and is therefore less complicated and less expensive than transmitting systems heretofore available.

A further object is to provide a system of transmission for wide deviation frequency modulation in which the desired final transmission frequency may be controlled by means of a frequency synthesizer of the type which has a control for each digit of the desired output frequency.

Briefly described, a system for transmitting signals in accordance with the invention includes a source of carrier signals. The carrier signals are modulated in either or both of two modes of modulation, say AM and FM, in accordance with one or more different input signals. A modulator may be provided in accordance with the invention having two channels, in one of which the carrier signals are shifted in phase. An amplitude modulating circuit is connected in the channel which carries the phase shifted carrier, and a balanced modulating circuit is connected in the other channel. The outputs of both channels are additively combined to produce the modulated signal; either or both the amplitude modulating circuit and the phase modulating circuit may be used at the same time. The modulator is operative at low signal levels and the modulated signal is desirably of a different frequency than the signal which is desired from the transmitter. The modulated signal is applied to a frequency multiplier channel and simultaneously to a frequency heterodyning channel. The frequency deviation of the FM modulation is increased by virtue of frequency multiplication of the modulated signal in the multiplying channel. A frequency synthesizer may provide injection frequencies to mixers in the heterodyning channel. Although the amplitude modulation of the modulated signals is effectively lost in the multiplying channel, such amplitude modulation is preserved in the heterodyning process. The outputs of the respective channels are mixed with each other to provide a high frequency output signal for transmission. This output signal may be at the desired transmission frequency and carries both the amplitude modulation information and/or the frequency modulation information. Linear amplification may be used to provide a high power signal for transmission by way of an antenna.

The invention itself, both as to its organization and method of operation, as well as additional objects and advantages thereof, will become more readily apparent from a reading of the following description in connection with the accompanying drawings in which.

Figure 1:
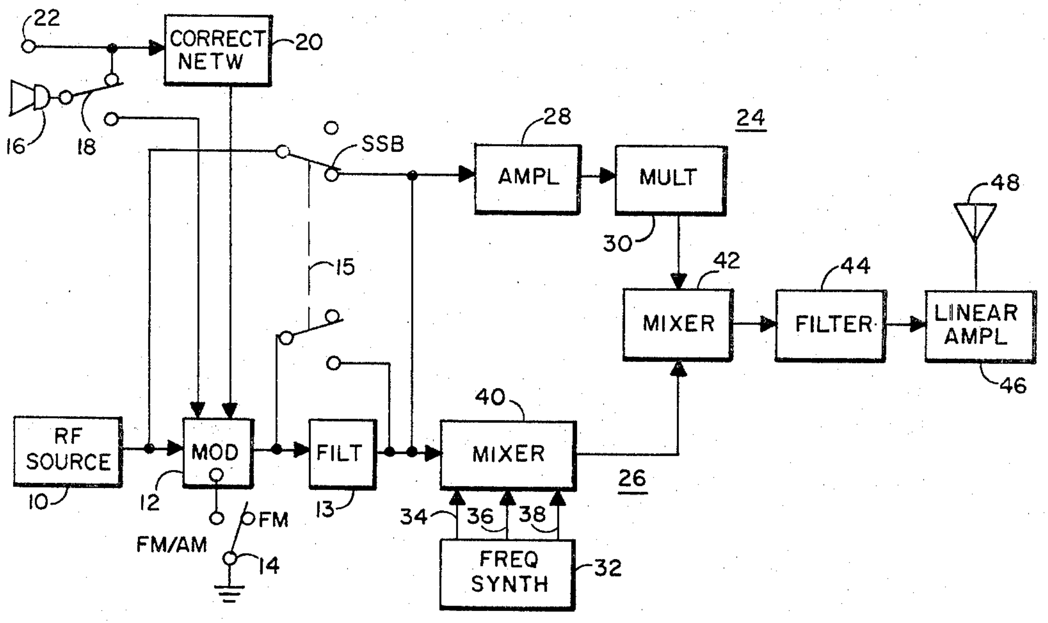
FIG. 1 is a block diagram of a transmitter embodying the invention.

Referring more particularly to FIG. 1, there is shown radio frequency source 10 which provides a carrier signal. This source may be a crystal oscillator. The carrier signal is applied to a modulator circuit 12 which includes a switch 14 for selecting either FM or FM and AM (FM/AM) modes of modulation. When the switch 14 is set for FM/AM, only AM modulation will be produced, provided that no input signals are applied to the FM modulating circuits in the modulator 12.

A microphone 16 is connectable by way of a switch 18 to the modulator 12 for providing inputs to the AM modulating circuits thereof. When FM modulation is desired, the switch 18 is connected to a correction network 20, which may be an integrating circuit, for applying signals to the FM modulating circuits of the modulator 12. The network 20 has another terminal 22 to which signals may be applied for FM modulation of the carrier. In one application, telemetry signals may be applied to the network 20 and voice signals produced by the microphone 16 may be simultaneously applied to the modulator 12. The modulator 12 uses the voice signals and the telemetry signals respectively for amplitude modulation and frequency modulation of the carrier signal.

The modulated signals from the output of the modulator are simultaneously applied to a multiplying channel 24 and to a heterodyning channel 26. The multiplying channel includes an amplifier 28 and a chain of (viz. tandem connected) multiplying circuits 30. The amplifier effectively buffers the multiplier circuits from the modulator 12. The multiplying circuits may be tuned amplifiers, each tuned to a frequency which is a higher harmonic of the carrier signal frequency.

If there also exists a requirement for this system to be capable of transmitting single side band signals, a selective filter 13 is inserted between the modulator 12 and the heterodyne channel 40. At the same time, the multiplier channel 30 is connected directly to the R.F. source 10 by means of a switch 15. When the switch 15 is in the position shown, the system is conditioned for SSB. When the switch is in the other position, the filter 10 is shorted and the system is conditioned for FM/AM modes of transmission with the carrier inserted.

The heterodyning channel 26 includes a frequency synthesizer 32, which may be a digital frequency synthesizer providing a plurality of decimally related injection frequencies, which are provided on three output lines, 34, 26 and 38. The signals provided on line 34 may be produced in 100 kc. increments in accordance with control switches in the synthesizer 32. The lines 36 and 38 signals may provide signals which may be varied in one megacycle and in ten megacycle steps respectively. In the event that the transmitter is to be used to transmit U.H.F. signals, the synthesizer may also provide another injection frequency variable in 100 mc. steps. The design of digital frequency synthesizers is known in the art. Reference may be had, for example, to Patent No. 3,054,057, issued Sept. 11, 1962.

The lines 34, 36 and 38 which carry the injection frequencies are connected to different ones of a plurality of tandem connected mixers 40, to the first of which the modulated signals from the modulator 12 are applied.

The outputs of the multiplying channel 24 and the heterodyning channel 26 are applied to a mixer 42 which heterodynes these outputs to produce an output signal which may be transmitted. A filter 44 may be used to select either the upper or lower sidebands of the mixer 42 output as desired. The filtered output signals are amplified in a linear amplifier 46 in order to preclude distortion of any amplitude modulation envelope carried by these signals. An antenna 48 connected to the output of the linear amplifier 46 may be used to radiate the signal. Thus, both amplitude and frequency signals may be transmitted on the same frequency. These signals may be received by the same or different receivers which have detectors responsive to frequency modulated and amplitude modulated signals.

The operation of the system may be better understood by assuming that the R.F. source 10 provides a carrier signal having a frequency of 100 kc. and by further assuming that the modulating signal is a 1 kc. audio frequency signal. The modulator 12 provides a 100 kc. signal having a frequency of plus or minus 1 kc., it being assumed that the nominal frequency deviation of the FM signal is also plus or minus 1 kc. The multiplier circuits 30, for example, multiply the 100 kc. modulated signal by ten and by producing a multiplying channel output having a frequency of 1 mc. and a frequency deviation of plus or minus 10 kc. It is also assumed that the injection frequencies provided by the synthesizer 32 on lines 34, 36 and 38 are respectively .04 mc., 4 mc. and 0 mc. Accordingly, the 100 kc. modulated signal provided by the heterodyning channel output has a frequency of 4.5 mc. and a frequency deviation of plus or minus 1 kc. The amplitude modulation information is contained in the envelope of the 4.5 signal. It will be appreciated, however, that the non-linear multipliers cause the loss of any amplitude modulation information in the multiplying channel 24. Only the frequency modulation information is preserved in the course of multiplication. Frequency modulation is also preserved in the course of heterodyning in the channel 26. The 4.5 mc. heterodyning channel output signal and the 1 mc. multiplying channel output signals, when heterodyned in the mixer 42, provide an output having an upper sideband frequency of 5.5 mc. and a frequency deviation of plus or minus 11 kc. It will be observed, that the frequency deviation of the output signal is enhanced thereby providing for better quality, so far as the FM signal is concerned. The amplitude information is also preserved by virtue of the heterodyning channel operation. The resulting output also has the desired transmission frequency. This transmission frequency may readily be altered by the use of the digital controls in the frequency synthesizer 32.

Figure 2:
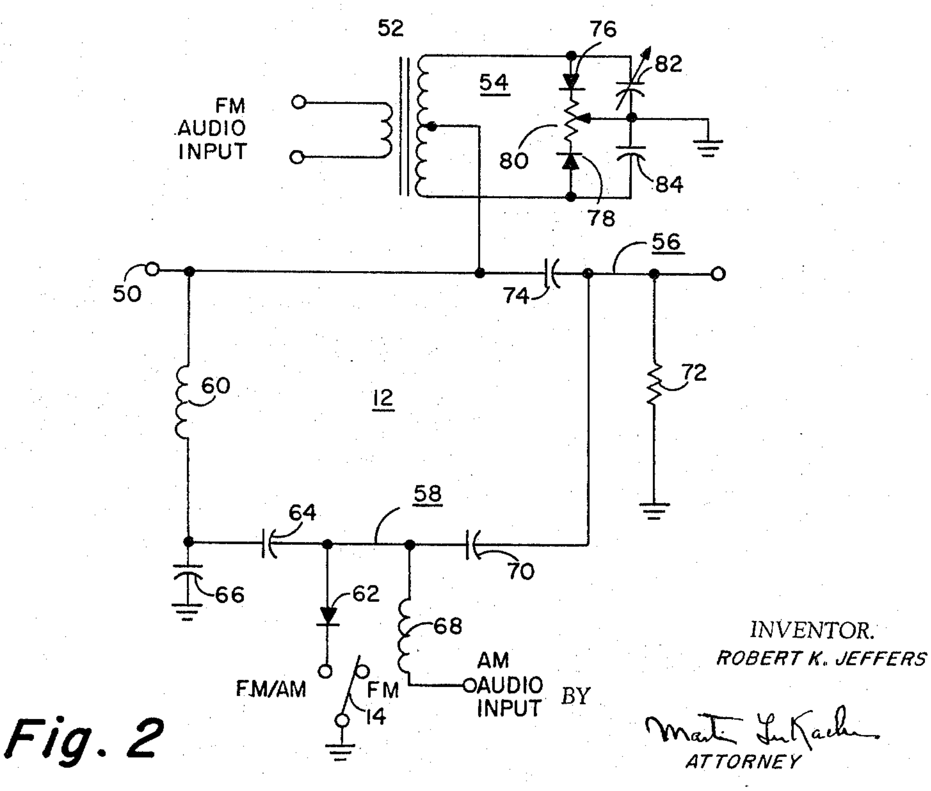
FIG. 2 is a circuit diagram of the modulator used in the transmitter of FIG. 1.

The modulating circuit 12, as shown in FIG. 2, includes a terminal 50 to which the carrier signal from the source 10 may be applied. The other terminal of the source 10 may be returned to ground and is therefore not shown. Where a terminal of an input source is not shown, it should be taken that the return terminal for that source is also ground.

The audio correction network 20 provides an output which is applied across the input winding of a transformer 52 of a balanced modulating circuit 54 which is connected to one channel 56 of the modulator 12. The other channel 58 of the modulating circuit 12 includes a delay line 60, shown as an inductor, which together with capacitor 66 shifts the carrier signal in phase, 90°. This phase shifted carrier is applied to an AM modulating circuit including a diode 62 which is connected to the delay line 60 by way of a capacitor 64. The diode 62 is connected to ground by way of the FM/AM-FM switch 14. Audio signals, say from the microphone 16, are applied across the diode 62 by way of a radio frequency choke coil 68. The phase shift channel 58 includes a coupling capacitor 70 which couples the phase shifted signals with or without amplitude modulation, depending upon the position of the switch 14 and the application of the audio signals, across an output resistor 72. The modulating circuit channel 56 output is also applied by way of a coupling capacitor 74 across the resistor 72 and is added to the phase shift channel 58 output.

The balanced modulator 54 includes a pair of diodes 76 and 78 which are connected across the output winding of the transformer 52 together with a balancing potentiometer 80. A pair of capacitors 82 and 84, the junction of which is connected to ground, may be connected across the output winding of the transformer 52 for capacitive balancing purposes. The top of the potentiometer 80 is connected to ground. It will be observed that the circuit 54 does not have any effect on the carrier signals which are transmitted by way of the channel 56, unless signals are applied to the input winding of the transformer 52. When the latter takes place, the diodes 76 and 78 conduct differentially during different portions of the carrier signal cycle, therefore effectively amplitude modulating the carrier. When the phase shifted carrier from the phase shift channel 58 is combined with the double sideband suppressed carrier signal from the balanced modulator 54, an output signal, which is phase modulated, is produced.

The modulated signal will contain only amplitude modulation, if no input signals are applied to the balanced modulator 54. Conversely, if the switch 14 is in the AM/FM position, both AM and FM modulator signals will be produced. These modulated signals are applied to the heterodyning channel 26 and the multiplying channel 24, to produce the signal for transmission, as described above.

From the foregoing description, it will be apparent that there has been provided an improved system for transmission of modulated signals, wherein both AM and FM modulation of a single carrier signal is accomplished. While FM modulation has been described as being obtained, it will be appreciated that phase modulation may readily be obtained. Other variations and modifications in the above described system, within the scope of the invention, will become apparent to those skilled in the art. Accordingly, the above description should be taken merely as illustrative and not in any limiting sense.

What is claimed is:

1. A system for transmitting signals having a plurality of different modes of modulation comprising (a) a source of carrier signals,
(b) modulation means for modulating said carrier signals in a plurality of different modes to produce a modulated signal,
(c) a frequency multiplying channel coupled to the output of said modulating means,
(d) a frequency heterodyning channel, wherein the frequency of said modulated signal is changed exclusively by the heterodyning process, also coupled to the output of said modulating means, and
(e) means for mixing the output of both said channels with each other to produce an output signal for transmission.

2. A system for transmitting signals having a plurality of different modes of modulation comprising (a) a source of carrier signals,
(b) modulation means for modulating said carrier signals in a plurality of different modes to produce a modulated signal,
(c) means for multiplying said modulated signal in frequency to provide a first output,
(d) a source of injection frequency signals,
(e) means for mixing said modulated signal with said injection signals for producing a second output,
(f) means for mixing said first and second outputs with each other to provide an output signal for for transmission,
(g) linear amplifying means for amplifying said output signal, and
(h) antenna means coupled to the output of said amplifier means.

3. A system for transmitting signals having a plurality of different modes of modulation comprising (a) a source of carrier signals,
(b) modulation means coupled to said source for modulating said carrier signals both in amplitude and in phase in accordance with an input signal,
(c) means for multiplying said modulated signal in frequency to provide a first output,
(d) a frequency synthesizer for producing injection signals of selectable frequency,
(e) means for mixing said modulated signal with said injection signals for producing a second output,
(f) means for mixing said first and second outputs with each other to provide an output signal for transmission,
(g) linear amplifying means for amplifying said output signal, and
(h) antenna means coupled to the output of said amplifier means.

4. A system for transmitting signals having amplitude modulation and frequency modulation comprising (a) a source of low power carrier signals,
(b) modulating means including (i) a pair of channels both for passing said carrier signals, (ii) a balanced modulating circuit connected to one of said channels, (iii) an amplitude modulating circuit and a phase shift circuit connected to the other of said channels, and (iv) means for additively combining the signal outputs from both of said channels to provide a modulated signal,
(c) means for multiplying said modulated signal in frequency to produce a first output,
(d) means for heterodyning said modulated signal to produce a second output, and
(e) means for mixing said first and second output with each other to provide a signal for transmission.

5. A system for transmitting signals having amplitude modulation and frequency modulation comprising (a) a source of low power carrier signals,
(b) modulating means including (i) a balanced modulating circuit and a phase shift circuit both responsive to said carrier signals, (ii) means for modulating the amplitude of signals produced by said phase shift circuit in accordance with a first input signal, (iii) means for applying a second input signal to said balanced modulating circuit for modulating the amplitude of the unphase shifted carrier signals, and (iv) means for additively combining the phase shifted amplitude modulated signals produced by said phase shift circuit and the amplitude modulated carrier signal produced by said balanced modulator with each other to provide a modulated signal,
(c) means for multiplying said modulated signal in frequency to produce a first output,
(d) means for heterodyning said modulated signal to produce a second output, and
(e) means for mixing said first and second output with each other to provide a signal for transmission.

6. A system for transmitting signals having a plurality of different modes of modulation comprising (a) a source of carrier signals,
(b) modulation means for modulating said carrier signals selectively in amplitude and phase in accordance with input signals,
(c) means for selecting one side band of the modulated carrier signals produced by said modulation means,
(d) means for multiplying said one side band and said carrier signal in frequency to provide a first output,
(e) means for providing injection frequency signals,
(f) means for mixing said one side band and said injection frequency signals to provide a second output,
(g) means for mixing said first and second outputs to provide a third output, and
(h) means for selecting a side band of said third output to produce a single side band signal for transmission.

7. A modulation system for use with a source of carrier signals comprising a first channel and a second channel, said channels having inputs coupled to said source, said first channel including a balanced modulating circuit for providing a suppressed carrier double side band signal in said first channel in accordance with a first input signal which is applied to said balanced modulator circuit, said second channel including a phase shift circuit for shifting the phase of said carrier signals by 90° and a circuit for modulating the amplitude of the signals from said source which are transmitted through said second channel in accordance with a second input signal, and means for additively combining the outputs of said first channel and said second channel.

8. A modulator for modulating a carrier signal in amplitude and phase comprising a first channel and a second channel, a balanced modulating circuit comprising a transformer having a primary winding for receiving an input signal and a secondary winding and a pair of unidirectionally conductive devices connected across said secondary winding and a pair of reactive elements also connected across said secondary winding, a connection from between said secondary winding at a center tap of said secondary winding to said first channel, said pair of reactive elements and said pair of devices being in balanced relationship with respect to their respective junctions, and said transformer being balanced with respect to said center tap, said junctions being connected to a point of reference potential, said second channel includes a phase shift circuit for shifting the phase of said carrier signal by 90° and a circuit including a unidirectionally conductive device connected to said channel, and means for applying another input signal across said last named device for modulating the amplitude of a signal transmitted through said second channel in accordance with said other input signal, and means for additively combining the outputs of said first channel and said second channel.

References Cited

UNITED STATES PATENTS

| | | | |
|---|---|---|---|
| 2,238,249 | 4/1941 | Crosby | 325—147 |
| 2,289,041 | 7/1942 | Roberts | 325—156 |
| 2,630,497 | 3/1953 | Armstrong | 332—21 X |
| 3,084,329 | 4/1963 | Clay | 325—60 X |
| 3,184,690 | 5/1965 | Garland | 332—43 |
| 3,260,964 | 7/1966 | Whitehead et al. | 325—47 |

ROBERT L. GRIFFIN, *Primary Examiner.*

JOHN W. CALDWELL, *Examiner.*

B. V. SAFOUREK, *Assistant Examiner.*